Patented Dec. 15, 1936

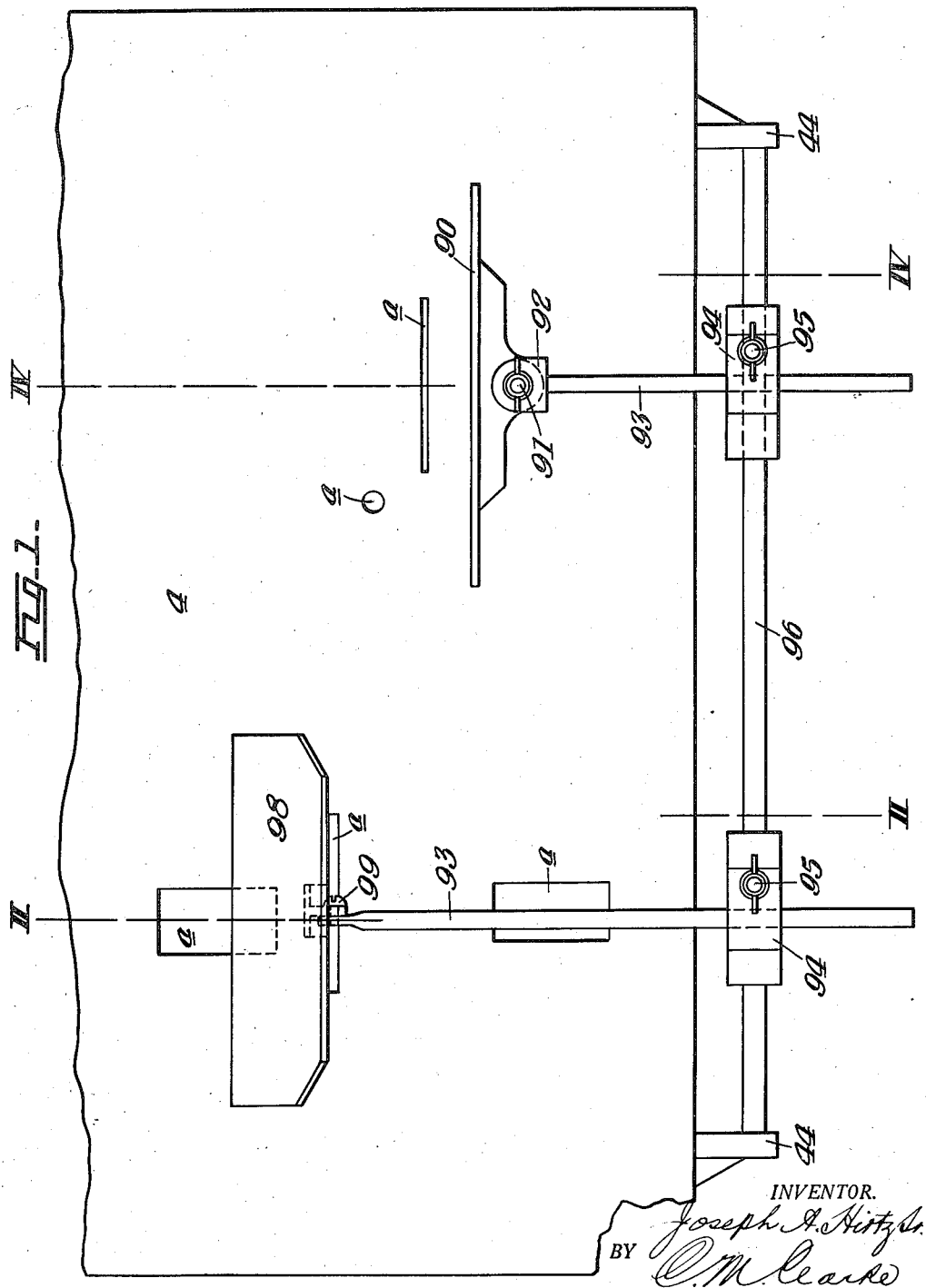

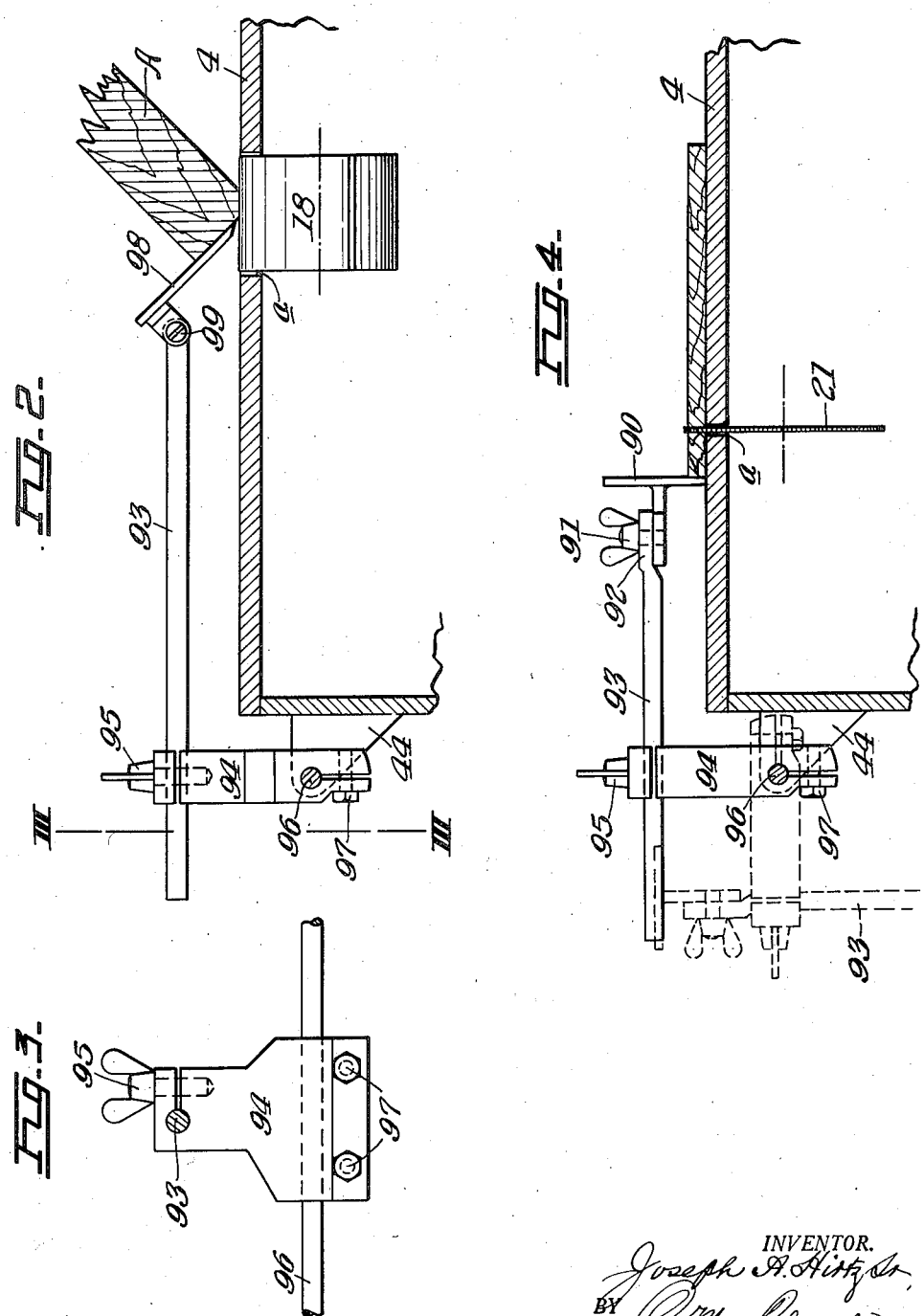

2,064,607

UNITED STATES PATENT OFFICE 2,064,607

GUIDE FOR WOODWORKING MACHINES

Joseph A. Hirtz, Sr., Mount Oliver, Pa., assignor of one-half to Ellsworth J. Smith, Sr., Mount Oliver, Pa.

Original application March 13, 1935, Serial No. 10,827. Divided and this application April 17, 1936, Serial No. 74,948

1 Claim. (Cl. 143—170)

My invention consists of an improvement in woodworking machines and is a division of my prior application Ser. No. 10,827. The particular portion of the application herein involved relates to adjustable guiding devices and mountings therefor, operable on the upper surface of a table, to control the feed or adjustment of articles being treated.

The guide members are so constructed and mounted as to be readily adjusted to the work in view, and to be readily thrown into operative relation to the table top and any particular appropriate tool or to be removed temporarily, while remaining as an accompanying attachment to the entire machine.

Certain preferred forms of the invention are shown in the accompanying drawings, in which:—

Fig. 1 is a general plan view of the top of a woodworking machine provided with two forms of guide;

Fig. 2 is a transverse section on the line II—II of Fig. 1;

Fig. 3 is a transverse section on the line III—III of Fig. 2;

Fig. 4 is a transverse section on the line IV—IV of Fig. 1.

The top 4 of the machine is provided with a series of appropriate suitably located clearance openings $a$ for extension therethrough of operating tools, preferably vertically adjustable or removable, as shown in my prior application. Such tools may be of the class of circular, band or jig saws, rotary planers or sanders, millers or groovers, or of any type of tool adapted to be adjusted and operated in working relation to the surface of top 4.

I show in Figs. 1 and 4 a guide member 90 having a vertical face capable of adjustment towards or from the clearance slot $a$ of a circular saw 21 for proper spacing and width of cut, and also of parallel adjustment therewith. The guide plate 90, which may be of conventional construction, is connected by a pivoting bolt 91 with terminal 92 of a transverse shaft or spindle 93. Spindle 93 is mounted for sliding engagement through a block 94 provided with a securing screw or bolt 95.

Block 94 is slidably mounted on a shaft 96 carried along and outwardly from the side of the machine and carried in bearings 44. The lower portion of the block is bifurcated below the shaft hole and is provided with one or more tightening and loosening bolts or screws 97, by which it may be fixedly held or loosened for outward swinging and lowering when not in use, as indicated in dotted lines, Fig. 4.

By longitudinal movement and adjustment of shaft 93 the guide 90 may be accurately adjusted at any desired distance from the cutting zone of the saw or other tool, depending on the work.

By the pivoting bolt connection 91 the face of guide 90 may also be laterally adjusted, as at right angles to the position shown, thus providing an abutting or limiting contact face for the work at any other desired location, by shifting the block 94 along shaft 96 and securing it by bolts 97.

Thus in slotting or cross cutting the piece may be moved towards the tool and against the face of guide 90 thus limiting the movement of the piece as desired.

I show in Fig. 2 a similar construction and mounting in which the spindle 93 is provided at its inner terminal with a guide plate 98 capable of being set at an angle to the table top. For such purpose the guide is provided with rear bearings pivotally connected with the end of the spindle by a securing screw or bolt 99 so as to adjust it to any desired degree of inclination.

By such means the plate may be set to any desired angle to form a slide bearing for a blank A so as to effect a bevel edge planing cut by passing it over a suitable tool, as a planer 18.

Guide 98 is thus capable of a considerable degree of adjustment, both as to angle as well as longitudinally and laterally of the machine, by manipulation of block 94. It may likewise be utilized where possible in connection with one or more of any of the various cutting tool units with which the machine may be equipped, operable through the various clearance openings $a$ in its top.

The manufacture and application of the adjustable guide of either form, or of any equivalent therefor, to a wood working or other applicable machine, is comparatively simple, cheap, and is capable of location and of placement when in disuse, in a limited space.

What I claim is:—

In combination with a supporting frame having a work supporting top and an outer laterally mounted cylindrical rod co-extensive with the length of the working area of the top and spaced outwardly therebelow, a sliding and tipping bearing block having at its lower portion a cylindrical bore for hinging and sliding mounting on said rod and provided with bifurcated terminals beyond the bore, a tightening and loosening clamping bolt extending through said bifurcated terminals for effecting tightening and loosening around the rod, the upper portion of the block having a cylindrical bore at right angles to said lower bore and a lateral clearance slot beyond the bore providing a gripping and loosening extension, a tightening and loosening clamping bolt extending through said extension for effecting tightening and loosening around an inserted rod, and a guide rod slidably mounted in the block provided with a work-guiding terminal adapted to be adjusted longitudinally or laterally of the work supporting top, said work guiding terminal being pivotally connected to the end of the guide rod and having tightening means holding the face of the work-guiding terminal in an adjusted angular relation to the horizontal face of the work supporting top, said bearing block being adapted for location of the guide rod and its terminal in operative position over the work supporting top and to be thrown outwardly and downwardly with the guide rod in receded position upon loosening the clamping bolts.

JOSEPH A. HIRTZ, Sr.